Patented June 24, 1941

2,246,527

UNITED STATES PATENT OFFICE 2,246,527

RESINOUS PRODUCT HAVING ANION EXCHANGE PROPERTIES AND METHOD OF PRODUCING SAME

Easton Melof, Chicago, Ill., assignor to National Aluminate Corporation, Chicago, Ill., a corporation of Delaware No Drawing. Application February 3, 1938, Serial No. 188,453

9 Claims. (Cl. 260—72)

The present invention relates to an organic condensation product of marked anion-exchange capacity, and to a process of producing the same.

One of the objects of the invention is to provide a condensation product of markedly increased anion-exchange capacity.

A further object is to provide a method of preparing such material from a condensation product derived from an aryl amine and an aldehyde.

A still further object is a method of increasing the anion-exchange capacity of an aryl amine-formaldehyde condensation product.

Another object is a process of introducing additional basic groups into an aryl amine-aldehyde condensation product whereby its exchange capacity may be substantially increased.

Other objects will appear as the invention is hereinafter more fully described.

The foregoing and other objects may be accomplished in accordance with the present invention, by introducing one or more nitro groups into an aryl amine-aldehyde condensation product, in such a manner that the basic groups, originally present in the starting material, are protected from the action of the agent employed to introduce such nitro groups. The nitro groups in the intermediate product are then converted into basic groups by treatment with a reducing agent. The resultant material, which comprises one aspect of the present invention, is characterized by an enhanced exchange capacity.

The process of increasing the exchange capacity of amine-aldehyde condensation products comprises another aspect of the present invention. This process or method, as briefly outlined in the preceding paragraph, may be applied with beneficial results, not only to amine-aldehyde condensation products which are effective as exchange materials before treatment, but also to amine-aldehyde condensation products which are initially not feasible for use as exchange materials. Thus, in accordance with the present invention, it is not necessary that the raw materials, subjected to the treatment as hereinafter described, constitute practicable exchange materials; and, indeed, one object of the present invention comprises a process of treating such amine-aldehyde condensation products for the purpose of converting them into products which are useful for the purpose of anion exchange.

From the foregoing, it will be apparent that the raw materials of the present invention may be selected from the class of aldehyde-amine condensation products, regardless of the exchange capacity of the original starting material. Thus, for example, I may start with an arylamine-aldehyde condensation product such as m-phenylenediamine-formaldehyde condensation product, which is characterized by a considerable capacity for removing anions from solution; and, by means of my improved process, the exchange capacity of this material may be very substantially increased. On the other hand, I may start out with an aryl amine-aldehyde condensation product such as that derived from toluidine and formaldehyde, which is not practicable as an exchange material, and, by means of the present invention, convert it into a material which is useful for such purpose. It will, of course, be apparent that as starting materials, products having varying degrees of exchange capacity between those specifically mentioned may be used if desired, and that the present invention may be used for the purpose of enhancing the exchange capacity of the starting material, regardless of its extent.

In order more clearly to illustrate the principles of the present invention, several specific examples will now be described. It is to be clearly understood, however, that this is done merely by way of example, and solely for the purpose of illustrating, by means of such specific examples, the basic principles which are broadly applicable to the class of amine-aldehyde condensation products as a whole. In other words, the present invention is not to be restricted to the specific examples which will now be described.

Example 1

The aryl polyamine-aldehyde condensation product employed as a starting material in this example comprises a m-phenylenediamine-formaldehyde resin or resinous product such as that described in the copending application of Willard H. Kirkpatrick, Serial No. 113,986, filed December 3, 1936, which matured into U. S. Patent No. 2,106,486, Jan. 25, 1938. It is to be understood, however, that the exact procedure used in preparing the starting materials forms no part of the present invention; and, moreover, the invention is not restricted to the raw materials prepared in accordance with the aforesaid Kirkpatrick patent.

The starting material is treated with a nitrating agent in such a manner that the amino groups present in the molecule are not destroyed by the action thereof. The protection of the amino groups may be accomplished, if desired, by acylation (for example, by acetylation) before the material is treated with nitric acid. Preferably, however, I carry out the nitration in the presence of sufficient sulfuric acid to form the amine sulfate. After the nitration has been completed and the reaction product is separated, the nitro group or groups are then converted into basic groups, and the resultant product is treated with dilute alkali in order to regenerate the free polyamine.

The actual procedure carried out was as follows: 10 parts by weight of the m-phenylenediamine-formaldehyde condensation product of such a particle size that it would pass through a 14-mesh screen, but be retained on a 48-mesh screen, was treated with a mixture of 50 parts by weight of glacial acetic acid, 100 parts by weight of sulfuric acid (sp. gr. 1.84) and 65 parts by weight of nitric acid (sp. gr. 1.42).

Upon the mixing of the reactants, the temperature rose steadily from 15° to 30° C. over a period of 45 minutes. The reaction mixture was then poured into water, the product was separated and washed, and then reduced with iron and hydrochloric acid (sp. gr. 1.12) in order to reduce the groups, introduced by the nitration, to the basic groups capable of increasing the exchange capacity of the material. The reduced product was thoroughly washed to remove the impurities and then dried. The product thus obtained was treated with a dilute alkaline solution such as an alkali metal hydroxide, for example, 5% caustic soda solution, and then washed completely free of excess alkali.

This example illustrates the application of the present invention to starting compounds which are already fairly good exchange materials; in other words, it illustrates the improvement or enhancement of the exchange capacity of materials which are already useful for the purpose of removing anions from solution.

*Example 2*

The second example illustrates the application of the present invention to an aldehyde amine condensation product which has extremely poor anion-exchange properties before treatment in accordance with the present invention.

The starting material comprised m-toluidine-formaldehyde condensation product which was prepared in the following manner:

120 grams of hydrochloric acid and 90 grams of formaldehyde were slowly added to 53 grams of m-toluidine. The reaction, which is initially violent, gave an immediate yellow-orange gel-like product which changed into a hard brittle product upon exposure to air for several hours at a temperature of 100° C.

A 20 gram sample of the above crushed product, which was passed through a 14-mesh screen and retained on a 48-mesh screen, was placed in a ¾ inch tube fitted with a quartz filter bed and retaining screen and treated with 400 cc. of a 3% sodium hydroxide solution at the rate of 15 cc. per minute. The material was washed free of excess caustic and then tested for anion-exchange capacity with water containing 98 grains per gallon of sulfuric acid and 8 grains per gallon of hydrochloric acid at a rate of 15 cc. per minute, but very little exchange took place, as the acid was removed from only 25 cc. of the feed-water. This product was impractical for the purpose of removing anions from solution.

It was then treated in accordance with the present invention, the details of the process being as follows:

30 grams of the above resin was allowed to react at 30° C. for 16 hours with a mixture of 60 grams of nitric acid (sp. gr. 1.42) and 100 grams of glacial acetic acid. The resin was washed and then 300 grams of concentrated hydrochloric acid (sp. gr. 1.19) and 75 grams of tin were added and allowed to react for 16 hours at 30° C.

After washing and drying the resin, the capacity of this material was determined on a 13-gram sample by the same method, using the same feed-water as on the initially formed product. The first 500 cc. of product water was substantially free from acids.

The bed is capable of further anion removal by regeneration with caustic and subsequent washing out of excess reagent.

*Example 3*

Example 3 illustrates the application of the present invention to an aldehyde-amine condensation product of moderate exchange capacity, for the purpose of substantially enhancing such capacity. The starting material consisted of an aniline-formaldehyde condensation product which was prepared in the following manner:

100 grams of aniline, 600 grams of water, 160 grams of hydrochloric acid (sp. gr. 1.2) and 125 grams of a 40% formaldehyde solution were vigorously stirred at room temperature, and the gel formed was dried on a steam plate at 100° C. It was crushed and screened so that it was passed through a 14-mesh screen and was retained by a 48-mesh screen.

The foregoing starting material was converted into a product of increased anion-exchange capacity by means of the following procedure:

10 grams of this material was left in a mixture of 53 grams of glacial acetic acid, 92 grams of concentrated sulfuric acid (sp. gr. 1.84) and 73 grams of nitric acid (sp. gr. 1.42) for 24 hours. After washing out the excess acid, the nitrated product was reduced overnight with mossy tin and hydrochloric acid. The washed product was dried.

Samples of water compounded so as to contain 132 grains per gallon of sulfuric acid, as $Na_2SO_4$, and 8.6 grains per gallon of hydrochloric acid, as NaCl, were passed respectively through the original condensation product and the nitrated condensation product. 20 grams of the original resin substantially removed the acids from 400 cc. of the solution, whereas 7 grams of the nitrated and reduced material substantially removed the acids from the same volume of solution. The nitrated and reduced material thus has almost three times the capacity of the original exchange material.

The products obtained as disclosed in the foregoing examples may be generally employed to remove acidic compounds from solutions thereof. Thus, for example, aqueous solutions of mineral acids such as sulfuric acid, hydrochloric acid or phosphoric acid; or aqueous solutions of organic acids such as the aliphatic acids, for example, acetic acid; or aqueous solutions of acidic salts such as sodium acid sulfate, may be rendered substantially neutral by passing said solutions over or through the product produced in accordance with my invention. In the case of the acid salts, such as sodium bisulfate, the effluent water contains no bisulfate ion, the material being converted into the neutral salt. Thus, when an aqueous solution of $NaHSO_4$, containing 50 grains per gallon, was passed through my improved anion-removal material, the total solids content was reduced 41% and the effluent water was neutral, the solids being present as Na₂SO₄.

When the improved condensation products in accordance with my invention are exhausted, they may be regenerated and rendered capable of further anion removal by treatment with an alkaline solution; for example, a dilute aqueous ammonium hydroxide or dilute aqueous alkali metal hydroxide, such as a 3% solution of sodium hydroxide.

In the foregoing detailed description of my invention it is apparent that many variations in detail may be made without departing from the spirit and scope thereof. Thus, for example, many reducing agents other than iron or tin and hydrochloric acid may be employed if desired; for example, nascent hydrogen in the presence of a suitable catalyst, such as nickel, etc. Furthermore, aryl amines other than those hereinbefore particularly mentioned may be used as starting materials. Thus, naphthalene amines may be employed if desired. It is also apparent that other aldehydes such as acetaldehyde and the like may be used in place of formaldehyde. Likewise, other condensing agents for bringing about the condensation between the aldehyde and the protected polyamine may be used. In general, any compound which is either acid or basic may be used for this purpose. Thus, alkalis such as sodium hydroxide are known to bring about the reaction. Likewise, mineral acids such as sulfuric acid, hydrobromic acid, phosphoric acid, and the like; acid salts, such as sodium acid sulfate, etc.; and organic acids such as acetic acid, etc., are effective. Other equivalents and variations in detail will be apparent to anyone skilled in the art. I therefore intend to be limited only in accordance with the following patent claims.

I claim:

1. The process of producing an anion-exchange material which comprises condensing toluidine with formaldehyde in the presence of hydrochloric acid to form a condensation product, treating the latter with a mixture of nitric and glacial acetic acids to introduce at least one nitro group into the phenyl nucleus of the product, and reducing said nitro group to amino group by means of tin and hydrochloric acid.

2. The process of producing an anion-exchange material which comprises condensing aniline with formaldehyde in the presence of hydrochloric acid to produce a condensation product, treating the latter with a mixture of acetic, sulfuric and nitric acids to introduce at least one nitro group into the phenyl nucleus of the product; and, after removal of the excess acid from the thus nitrated product, reducing the nitro group to amino group by means of tin and hydrochloric acid.

3. The method of enhancing the anion-exchange capacity of a resinous condensation product of an aldehyde and an aryl amine having at least one primary amino-group, which comprises introducing at least one nitro group into the aromatic nucleus of said condensation product by means of a nitrating agent while protecting the basic groups thereof from the effect of said nitrating agent, and thereafter reducing said nitro group to an amino group and regenerating the original basic groups of said condensation product, whereby to produce a product of greater anion exchange capacity than the original resinous condensation product.

4. A method of producing a material having anion-exchange properties from a resinous condensation product of an aliphatic aldehyde and an aryl amine having at least one primary amino group, which method comprises nitrating said resinous product while protecting the basic groups of said resinous product from the effect of the nitrating agent, whereby to introduce at least one nitro group into the aromatic nucleus of said resinous product, and thereafter reducing said nitro group to an amino group and regenerating by hydrolysis the basic groups originally present in said resinous product, whereby to produce a material of enhanced anion-exchange capacity.

5. A method of producing a material having anion-exchange properties from a resinous condensation product of an aliphatic aldehyde and an aryl polyamine having at least one primary amino group, which method comprises nitrating said resinous product while protecting the basic groups of said resinous product by combination of said groups with a protective acid, whereby to introduce at least one nitro group into the aromatic nucleus of said resinous condensation product, thereafter reducing said nitro group to an amino group, and regenerating by hydrolysis the basic groups originally present in said condensation product, whereby to produce a material of enhanced anion exchange capacity.

6. A method of producing an anion-exchange material from a resinous condensation product of formaldehyde and phenylenediamine, which comprises nitrating said resinous product in the presence of sufficient sulfuric acid to protect the basic groups of said resinous product from the nitrating agent, whereby to introduce at least one nitro group into the aromatic nucleus of said resinous product, thereafter reducing said nitro group to an amino group, and removing said sulfuric acid from combination with the basic groups originally present in said condensation product, by means of an alkaline hydrolyzing agent, whereby to produce a product of enhanced anion exchange capacity.

7. A product characterized by anion-exchange properties and produced from an aliphatic aldehyde-aryl amine resinous condensation product wherein said aryl amine has at least one primary amino group, by nitrating said resinous product while protecting the basic groups thereof from the effect of the nitrating agent by combination of said basic groups with a protective acid, whereby to introduce at least one nitro group into the aromatic nucleus of said resinous product; and thereafter reducing said nitro group to an amino group and regenerating by hydrolysis the basic groups originally present in said resinous product.

8. The product of claim 7 wherein said aryl amine comprises m-phenylenediamine, and said aldehyde comprises formaldehyde.

9. The product of claim 7 wherein said protective acid comprises sulfuric acid.

EASTON MELOF.